J. W. IVERS.
ROCKING ATTACHMENT FOR BABY CARRIAGES.
APPLICATION FILED JUNE 6, 1910.

987,234.

Patented Mar. 21, 1911.

2 SHEETS—SHEET 1.

Witnesses
J Adolph Bishop
E. H. Griesbauer

Inventor
J. W. Ivers,
by H. B. Willson & Co
Attorneys

J. W. IVERS.
ROCKING ATTACHMENT FOR BABY CARRIAGES.
APPLICATION FILED JUNE 6, 1910.
987,234.
Patented Mar. 21, 1911.
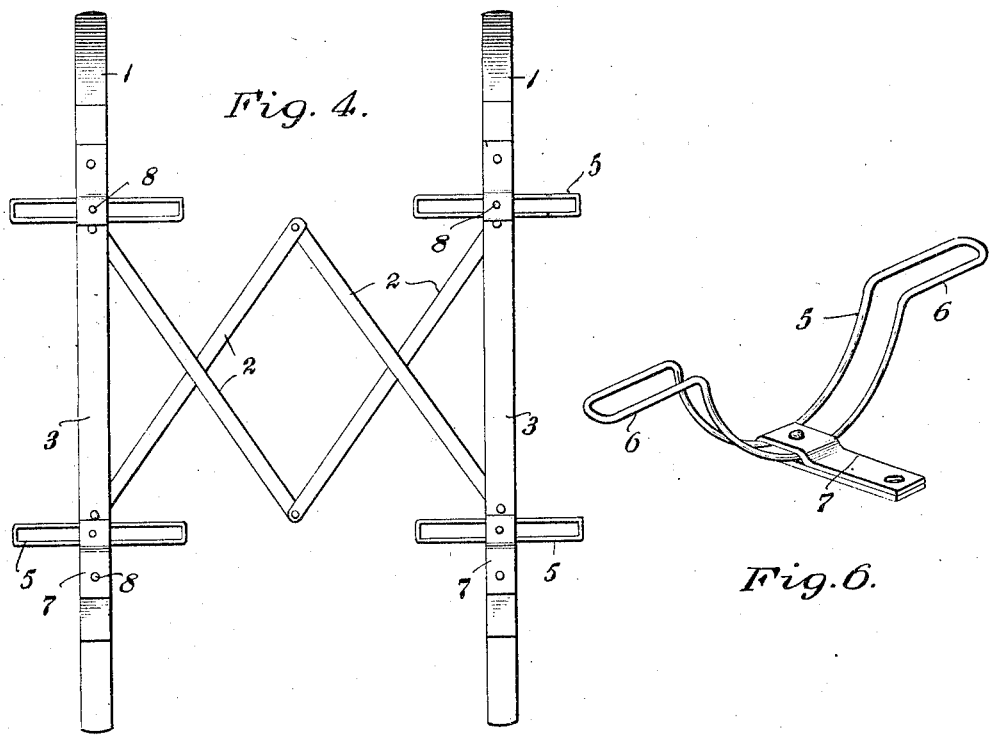
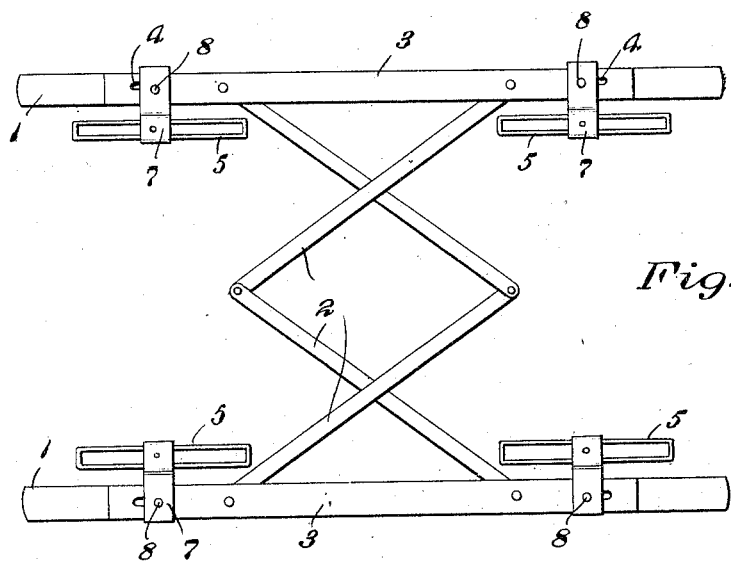

UNITED STATES PATENT OFFICE.

JOHN W. IVERS, OF OKLAHOMA, OKLAHOMA, ASSIGNOR OF ONE-HALF TO FRANK T. GORDON, OF OKLAHOMA, OKLAHOMA.

ROCKING ATTACHMENT FOR BABY-CARRIAGES.

987,234.

Specification of Letters Patent. Patented Mar. 21, 1911.

Application filed June 6, 1910. Serial No. 565,166.

*To all whom it may concern:*

Be it known that I, JOHN W. IVERS, a citizen of the United States, residing at 1108 West Tenth street, in the city and county of Oklahoma and State of Oklahoma, have invented certain new and useful Improvements in Rocking Attachments for Baby-Carriages; and I do declare the following to be a full, clear, and exact description of the invention, such as will enable others skilled in the art to which it appertains to make and use the same.

This invention relates to improvements in rocking attachments in baby carriages.

One object of the invention is to provide a pair of rockers having means to adjustably connect the same together whereby they may be applied to the wheels of any baby carriage.

Another object is to provide a rocking attachment of this character which may be applied to the carriage in different positions to permit the latter to be rocked longitudinally or sidewise.

With these and other objects in view the invention consists of certain novel features of construction, combination and arrangement of parts as will be more fully described and particularly pointed out in the appended claim.

Figure 1:
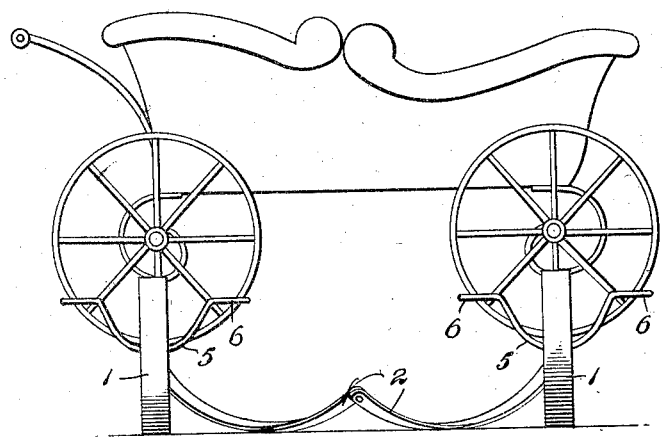
Figure 2:
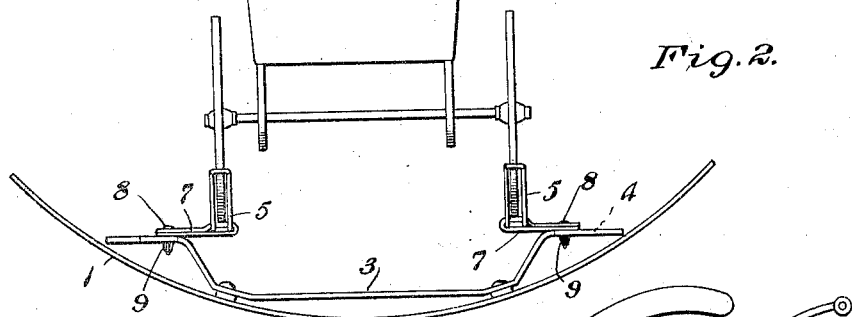
Figure 3:
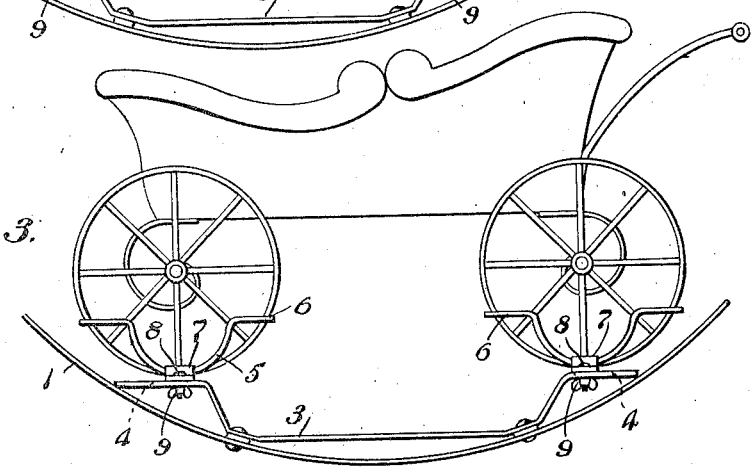

In the accompanying drawings: Figure 1 is a side view of a baby carriage showing the application of my invention thereto; Fig. 2 is an end view of the same; Fig. 3 is a side view showing the attachment applied to the carriage for the purpose of rocking the same longitudinally or endwise; Fig. 4 is a plan view of the rocking attachment removed from the carriage and showing the wheel engaging devices of the attachment arranged for receiving the wheels when the carriage is to be rocked sidewise as shown in Figs. 1 and 2; Fig. 5 is a similar view showing the wheel engaging devices arranged in position for receiving the wheels when the carriage is to be rocked longitudinally or endwise as shown in Fig. 3; Fig. 6 is a detail perspective view of one of the wheel engaging devices of the attachment.

In the embodiment of the invention I provide a pair of rockers 1 which may be constructed of any suitable material and may be of any desired length. The rockers 1 are connected together midway between their ends by a series of links 2 the ends of which are pivotally secured to the upper sides of the rockers near their opposite ends as shown. Secured to the rockers 1 preferably by the same fastening devices which secure the ends of the links thereto are carriage supporting bars 3. In the opposite upwardly projecting ends of the bars 3 are formed longitudinal slots 4 with which are adjustably connected wheel engaging racks 5. The wheel engaging racks 5 are preferably constructed of wire rods bent into the form of curved loop shaped frames the opposite ends 6 of which are bent longitudinally at an angle to the curved portion of the racks as shown. In the center of the curved portion of each of the racks is secured a clip 7. The clip 7 is pivotally and adjustably secured to the slotted ends of the bars 3 by means of a clamping bolt 8 arranged in the slots 4 and projecting through an aperture in the projecting ends of the clips and on which is screwed a clamping nut 9 which is preferably in the form of a thumb nut.

When it is desired to rock the carriage sidewise the wheel engaging racks are turned to a position crosswise of the rockers in which position they are secured by screwing up the clamping nut of the bolt 8 in the clips. When the racks are arranged in this position they may be adjusted laterally to fit any desired width of wheels by moving the clips inwardly or outwardly in the slots 4 of the bars 3. When it is desired to rock the carriage longitudinally or lengthwise the racks are turned to a position parallel with the rockers and the supporting bars 3 and are fastened in the manner described. When the racks are arranged in the latter position they may be adjusted for engagement with the wheels by moving the runners laterally thus opening or closing the link connection between the same.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claim.

Having thus described my invention what I claim is:

In an attachment of the character described, a pair of rockers, a series of links connecting said rockers together, supporting bars secured to the rockers and a series of wheel engaging racks pivotally and adjustably secured to the outer ends of said bars and adapted to be arranged to receive the wheels of the carriage whereby the latter is supported for sidewise or endwise rocking.

In testimony whereof I have hereunto set my hand in presence of two subscribing witnesses.

JOHN W. IVERS.

Witnesses:
O. K. BERKE,
U. H. NICHOLS.